Figure 1:
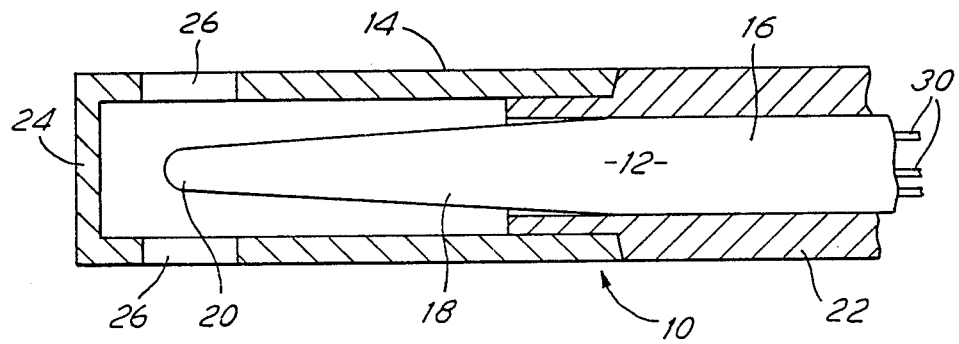

United States Patent [19]

Broomfield

[11] Patent Number: 4,865,462
[45] Date of Patent: Sep. 12, 1989

[54] THERMOCOUPLES

[75] Inventor: Geoffrey H. Broomfield, Tilehurst, England

[73] Assignee: Schlumberger Electronics (UK) Limited, Hampshire, England

[21] Appl. No.: 165,256

[22] Filed: Mar. 7, 1988

[30] Foreign Application Priority Data

Mar. 7, 1987 [GB] United Kingdom ............... 8705372

[51] Int. Cl.⁴ ............................................. G01K 7/04
[52] U.S. Cl. .................................... 374/179; 136/232
[58] Field of Search ............... 374/179; 136/230, 232, 136/233

[56] References Cited

U.S. PATENT DOCUMENTS

| 3,449,174 | 6/1969 | Kleinle | 136/230 |
|---|---|---|---|
| 3,451,860 | 6/1969 | Schwartzwalder et al. | 136/230 |
| 3,463,674 | 8/1969 | Black et al. | 136/233 |
| 3,538,596 | 11/1970 | Davis et al. | 136/232 |
| 3,649,368 | 3/1972 | Sine | 136/232 |
| 3,713,899 | 1/1973 | Sebestyen | 136/233 |
| 3,942,242 | 3/1976 | Rizzolo | 136/233 |
| 4,001,045 | 1/1977 | Smith | 136/230 |
| 4,018,624 | 4/1977 | Rizzolo | 374/179 |
| 4,253,469 | 3/1981 | Aslan | 374/179 |
| 4,527,909 | 7/1985 | Dale et al. | 374/179 |

FOREIGN PATENT DOCUMENTS

| 3411332 | 10/1985 | Fed. Rep. of Germany | 136/233 |
|---|---|---|---|
| 1408266 | 7/1965 | France | 374/179 |
| 1473466 | 3/1967 | France | 136/230 |
| 0047423 | 4/1980 | Japan | 374/179 |
| 994235 | 6/1965 | United Kingdom | 136/233 |
| 1452681 | 10/1976 | United Kingdom . | |

Primary Examiner—Allan N. Shoap
Assistant Examiner—Thomas B. Will
Attorney, Agent, or Firm—Sanford J. Asman

[57] ABSTRACT

A thermocouple, particularly for use in a gas turbine engine, comprises a mineral-insulated thermocouple element having its sensing end reduced in diameter by swaging, to increase sensitivity and reduce response time. Instead of swaging the whole sensing end to the reduced diameter, with a relatively large taper angle, typically about 14°, between the swaged and unswaged portions, the end is provided with a more gradual taper extending over substantially its whole length and having an inclusive taper angle of not more than 5°, and preferably about 2½°.

3 Claims, 1 Drawing Sheet

THERMOCOUPLES

This invention relates to thermocouples, and is more particularly but not exclusively concerned with thermocouples based upon mineral-insulated thermocouple elements, primarily for use in gas turbine engines.

In United Kingdom Patent Specification No. 1 452 681, there is disclosed a thermocouple comprising a mineral-insulated thermocouple element having a main body portion of a first diameter connected to a reduced diameter end portion by a short tapering portion. In one practical implementation of the mineral-insulated thermocouple element, the diameter of the main body portion is about 4.5 mm, the diameter of the end portion is about 2.0 mm, and the length of the short tapering portion is about 10 mm: in particular, therefore, the inclusive angle of taper of the tapering portion is just over fourteen degrees.

The element is normally produced by swaging one end of a suitable length of 4.5 mm diameter mineral-insulated thermocouple material, which consists of a cylindrical metal sheath containing one or more pairs of thermocouple wires insulated from each other and from the sheath by a powdered mineral insulant such as magnesium oxide, so as to reduce its diameter to the aforementioned 2.0 mm. After the swaging step, the two wires of the or each pair of thermocouple wires are welded together to form one or more thermocouple junctions at or closely adjacent the end of the swaged portion remote from the unswaged main body portion, which end thus constitutes the sensing tip of the thermocouple.

The reason for swaging the end portion of the mineral-insulated thermocouple element to the reduced diameter of 2.0 mm is to increase the sensitivity and speed of response of the thermocouple to changes in temperature. However, it has the undesirable side effect that the thermocouple is occasionally subject to sudden failure, due to breakage of one or more of the thermocouple wires within the reduced diameter end portion, usually adjacent the tapering portion over which the change in diameter takes place. It is an object of the present invention to alleviate this problem.

According to the present invention, there is provided a thermocouple including a mineral-insulated thermocouple element having a first relatively larger cross-section portion connected to a sensing tip of relatively smaller cross-section by a tapered connecting portion having an inclusive angle of taper not exceeding five degrees.

Preferably, the angle of taper is between two degrees and three degrees.

Figure 2:
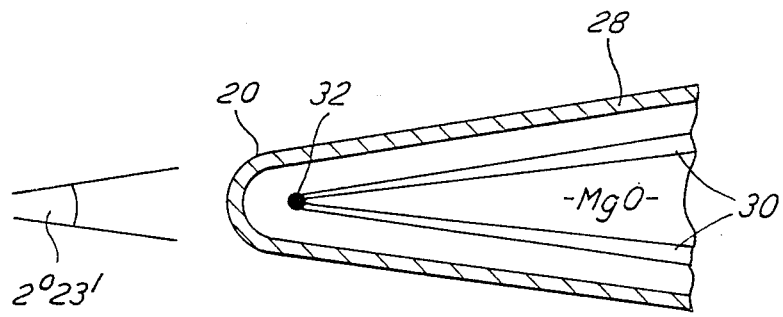

The invention will now be described, by way of example only, with reference to the accompanying drawings, of which:

FIG. 1 is a somewhat diagrammatic part-sectional view of a thermocouple in accordance with the present invention; and FIG. 2 is an enlarged and more detailed sectional view of part of the thermocouple of FIG. 1.

The thermocouple shown in FIG. 1 is indicated generally at 10, and comprises a mineral-insulated thermocouple element 12 mounted within a cylindrical protective sheath 14. The element 12 comprises a main body 16, having at one end a tapered connecting portion 18 which terminates at a sensing tip 20. The sensing tip 20 contains a plurality of thermocouple junctions, as will hereinafter become apparent.

The sheath 14 comprises a main tubular part 22 of stainless steel, which tightly coaxially surrounds and is brazed to the main body 16 of the element 12. The sheath 14 also includes a closed tubular end cap 24, which is welded to the main tubular part 22 and which coaxially surrounds, but is spaced from, the tapered portion 18 and the sensing tip 20. The end cap 24 is provided with ports 26 aligned with the sensing tip 20, to allow a gas flow, e.g. in a gas turbine engine, to pass over the sensing tip.

As shown in FIG. 2, the thermocouple element 12 itself comprises a cylindrical outer sheath 28, typically of stainless steel or Inconel 600, and a plurality of pairs (typically three pairs) of thermocouple wires 30, typically K type, N type or R type, which are insulated from each other and from the sheath 28 by magnesium oxide powder.

The thermocouple element 12 is produced by cutting off a suitable length from a much longer continuous coil of the mineral-insulated thermocouple material, the material initially having a uniform outside diameter of about 4.5 mm and being open at both ends of the sheath 28. The end of the cut length at which it is desired to form the sensing tip 20 is then swaged so as to progressively reduce its outside diameter from 4.5 mm to 2.0 mm, typically over a length of 60 mm: the swaged length thus constitutes the tapered connecting portion 18 mentioned earlier, and has an inclusive taper angle of about two degrees twenty-three minutes.

At this point, the end of the element 12 which is to become the sensing tip 20 is still open, and the respective ends of the three pairs of wires 30 are accessible through it. After clearing the magnesium oxide powder from the region immediately adjacent the ends of the wires 30, the wires of each pair are welded together, just inside the open end of the sheath 16, to form three thermocouple junctions, one of which is shown at 32 in FIG. 2. The open end of the sheath 28 is then welded shut, to complete the sensing tip 20.

The thermocouple 10 has substantially the same sensitivity and speed of response to temperature changes as the prior art thermocouple discussed hereinabove, since its dimensions, in the immediate region of the sensing tip 20, are very similar to those of the prior art thermocouple. However, the thermocouple 10 is far less prone to the sudden failures which occasionally affected the prior art thermocouple.

Several modifications can be made to the thermocouple 10. In particular, the angle of taper of the tapered connecting portion 18 can be increased from two degrees twenty-three minutes, for example to five degrees. Also, the sensing tip 20 need not be of negligible length, but can for example be profiled such that it comprises a short portion, of uniform 2.0 mm diameter, whose length does not exceed three times this 2.0 mm diameter. Finally, if necessary, the connecting portion 18 can be supported within the sheath 14 as described in the aforementioned United Kingdom Patent Specification.

I claim:

1. A thermocouple including a mineral-insulated thermocouple element having a first relatively larger cross-section portion connected to a sensing tip of relatively smaller cross-section by a tapered connecting portion, said connecting portion and said sensing tip being produced by swaging one end of said element to reduce its cross-section from said first relatively larger cross section, wherein said connecting portion has an inclusive angle of taper not exceeding five degrees.

2. A thermocouple as claimed in claim 1, wherein the angle of taper is between two degrees and three degrees.

3. A thermocouple as claimed in claim 1, wherein said cross-sections are substantially circular.

* * * * *